United States Patent [19]

Edwards et al.

[11] Patent Number: 5,222,559
[45] Date of Patent: Jun. 29, 1993

[54] VALVES

[75] Inventors: Jeffrey C. Edwards; Ray Johns; Robert D. Buchanan, all of Aberdeen, Scotland

[73] Assignee: Exploration and Production Services (North Sea) Ltd., Reading, England

[21] Appl. No.: 768,855

[22] PCT Filed: Apr. 17, 1990

[86] PCT No.: PCT/GB90/00571
§ 371 Date: Oct. 8, 1991
§ 102(e) Date: Oct. 8, 1991

[87] PCT Pub. No.: WO90/13764
PCT Pub. Date: Nov. 15, 1990

[30] Foreign Application Priority Data

Apr. 28, 1989 [GB] United Kingdom ............ 8909903

[51] Int. Cl.[5] ................................ E21B 43/12
[52] U.S. Cl. ........................ 166/321; 251/62
[58] Field of Search ........... 166/321, 323, 334, 240; 251/62

[56] References Cited

U.S. PATENT DOCUMENTS

| 3,685,790 | 8/1972 | Crowe | 74/2 X |
| 4,071,088 | 1/1978 | Mott | 251/62 X |
| 4,113,012 | 9/1978 | Evans et al. | 166/321 X |
| 4,265,141 | 5/1981 | Bowman | 74/520 X |
| 4,986,357 | 1/1991 | Pringle | 166/321 X |

Primary Examiner—William P. Neuder
Attorney, Agent, or Firm—Brady, O'Boyle & Gates

[57] ABSTRACT

For use as part of a test string employed to evaluate the production potential of a chosen formation through which an oil well has been drilled, an annulus-pressure-operated sub-surface control valve, typically a ball valve, wherein to deal with the problem of the high pressure of fluid acting on the upstream side of the ball resulting in the frictional forces caused by the ball being pressed up against the seating on its downstream side making the ball stick, the utilization of a differential thread force multiplier by which the actuating force may be applied to the ball. Moreover, to deal with the problem, experienced when employing a biased-closed valve, that the annulus pressure needed to keep the valve open may have to be maintained for extended periods, the invention provides latch means whereby the valve actuating sleeve may be retained in the valve-open position even when the applied annulus pressure is removed, a first pulse of applied annulus pressure causing the valve to open and then, as the pressure is removed, become latched in the open state, and thereafter a second pulse of applied annulus pressure unlatching the valve and allowing it to close once the pulse has ended.

19 Claims, 6 Drawing Sheets

VALVES

BACKGROUND OF THE INVENTION

1. Field of the Invention

This invention relates to valves, and concerns in particular the mechanism by which ball valves—especially those employed in tools used for the testing of subterranean wells, particularly oil wells—are operated against severe resistive forces.

2. Description of the Prior Art

Whether at sea or on land, the first steps in the production of a new hydrocarbon well—an oil well—are the drilling of the well bore itself through the various formations within the earth's crust beneath the drilling rig, followed by "casing" (the introduction and cementing into position of piping which will serve to support and line the bore) and the placing in the bore, at the depth of a formation of interest, of a device known as a packer, into which inner tubing (of smaller diameter than the casing) can subsequently be lodged.

The next work carried out is normally some programme of testing, for the purpose of evaluating the production potential of the chosen formation. The testing procedure usually involves the measurement of downhole temperatures and pressures, in both static and flow conditions (the latter being when fluid from the relevant formation is allowed to flow into and up the well), and the subsequent calculation of various well parameters. To collect the necessary data there is lowered into the well a test string—a length of tubing containing the tools required for testing. The flow of fluid from the formation of interest into the well bore and thus to the test tools is controlled by a valve known as a sub-surface control valve, and it is with valves suitable for this purpose, and their operating mechanisms, that the invention is concerned.

The operation of the various tools included in the downhole test string can be effected using one of three main types of mechanism. These types are those actuated by reciprocal motion of the pipe string (the inner tube, of which the test string constitutes a part), by rotational motion of the pipe string, or by changes in the pressure differential between the tubing and the annular space which surrounds it in the well—hereinafter referred to simply as "the annulus". Test strings wherein the tools thereof are actuated by changes in annulus pressure are at present much in vogue, and it is this type of actuation mechanism that is to be employed with the valves of the invention.

A mechanism of the annulus pressure-responsive type requires the provision and maintenance of a fixed "reference" pressure within the tool. This, used in conjunction with an adjustable (and higher) annulus pressure, allows the establishment of the chosen pressure differential necessary to control the operation of the appropriate component of the test string. The achievement of such a fixed reference pressure is the subject of our co-pending British Patent Application No. 89/07,098.1.

An essential component of the test string is a valve known as the sub-surface control valve. This governs the overall control of the testing procedure by permitting the flow of fluid out of the formation and into and up the well tubing to the various test tools. The density of drilling fluid in the tubing above this valve is adjusted such that its hydrostatic pressure at the depth of the formation is lower than the formation fluid pressure. Thus, when the valve is opened, formation fluid is permitted to enter the well bore through perforations in the casing and flow into the tubing string (and possibly to the surface therethrough). This contrasts with the situation during drilling, when the drilling fluid must exert a hydrostatic pressure greater than the formation fluid pressure in order to prevent the fluid's escape to the surface.

The sub-surface control valve is conveniently an example of a type of valve known as a ball valve. In principle, a ball valve is a variety of valve in which the valve member—the part physically preventing or allowing the passage of some fluid material along a passageway (a pipe, say)—is shaped like a ball with a hole extending therethrough, and is mounted in the passageway for rotation between a position where the hole is aligned with the passageway, so opening the valve and allowing fluid to pass therethrough, and another position where the hole is not so aligned, so closing the valve and preventing fluid passing therethrough. The ball may be positively driven in both directions—that is to say, it may be necessary to apply an actuating force to the ball to open the valve, and then to apply another, and opposite, actuating force to close the valve. An alternative, however, is to bias the ball in one sense—valve closed, say—so that it is only necessary to apply a positive actuating force when the ball is to be moved in the opposite sense—the valve is to be opened, say—and merely removing this force allows the bias to return the ball to its original position (thus, to close the valve).

The manner in which the ball is caused to rotate may employ any one of several different mechanisms, but a convenient one uses a pin projecting from the ball at a position spaced from the intended rotational axis, so that it acts like a crank, and a force applied to the pin round the pin's and the axis' common plane will rotate the ball.

The mounting of the ball will generally be in some sort of sealing seating arrangement (so that fluid cannot easily pass around the ball valve in the unaligned position), and often the ball will also be positively pivoted on some axle-like members, so that it rotates around an axis defined by these members. In some situations, however, it is possible and/or desirable to do without the pivot axle, and to have the ball float—sit "loosely"—within its mounting, restrained only by the seating and the passageway's side walls. This arrangement can work well, but nevertheless does give rise to problems under certain circumstances. More specifically, where the pressure of fluid acting on the upstream side of the ball is very high, the frictional forces caused by the ball being pressed up against the seating on its downstream side may also be high—indeed, they may be so high as to necessitate the application of an inordinately large force to rotate the ball thereagainst into its aligned, valve-open, position. It may even be that the rotational force required to be applied is higher than is available. It is this problem with which the invention is concerned.

A typical example of the thus-described "floating ball" ball valve is that commonly used in an oil well's test string sub-surface control valve. This valve may be actuated in a number of ways, but conveniently there is employed a modified version of the projecting pin arrangement mentioned above, wherein a fixed pin on a pipe-aligned actuating sleeve (or "mandrel") moveable back and forth "along" the pipe projects into an off-axis slot on the ball's side face, so that moving the sleeve provides, via the pin, the required normal force, and so rotates the ball. As discussed above, the operation of the various components in the test string is initiated and driven by applied annulus pressure.

An oil well, however, is a prime example of an environment in which the pressure of the fluid on the upstream side of the valve may be very high. Thus, where (as is usually the case) the ball valve is of the "floating ball" variety the ball (the valve member) is pressed hard up against the seating on the downstream side—so hard, perhaps, that the frictional forces involved are sufficient to prevent the ball rotating when the valve-opening force is applied. If such a situation is indeed encountered in a case where the valve is the sub-surface control valve for, say, a test pipe string, then there may be nothing for it but to remove the string and replace the valve.

This is extremely time-consuming, and so expensive, and the invention seeks to avoid the problem by enabling a much higher actuating force to be applied to the ball, high enough to overcome any foreseeable frictional forces. More particularly, the invention suggests that the actuating force be applied to the valve via a differential thread force multiplier, so that through the same, relatively low actuating force can be applied the ball experiences a much higher force—and thus opens despite the fluid-pressure-induced friction.

In an arrangement in which the valve is biased closed (in order that in the event of an accident it may "fail safe"), and is operated by the application to the annulus of a pressure that is high relative to the tool-contained reference pressure—an annulus over-pressure—it is necessary to continue to apply this annulus pressure in order to keep the valve open. It may be inconvenient, though, to maintain the application of the pressure for extended periods. Nevertheless, the well testing procedure may require that the sub-surface control valve remain open for such extended periods—and, obviously, these considerations are mutually exclusive. In principle, this dilemma can be solved, for a valve having a ball within a seating and an associated actuating sleeve biased closed, by providing latch means whereby the valve actuating sleeve may be retained in the valve-open position even when the applied annulus pressure is removed. However, there is then naturally required some means of eventually unlatching the sleeve, and so closing the valve. The invention suggests just such a solution wherein a first pulse of applied annulus pressure causes the valve to open and then, as the pressure is removed, become latched in the open state, and thereafter a second pulse of applied annulus pressure unlatches the valve and allows it to close once the pulse has ended.

BRIEF SUMMARY OF THE INVENTION

In one aspect, therefore, this invention provides a ball valve of the type having a floating ball within a seating and an associated actuating member drivably connected to the ball and to which force is applied to drive the ball between its valve-open and valve-closed positions, wherein there is operatively linked to the actuating member a differential thread force multiplier to which the actuating force is applied.

In a second aspect, this invention provides apparatus for latching a longitudinally moveable member to a fixed member against bias-induced relative movement in one such direction, which apparatus comprises:

two pin-like latching means, mounted on the moveable member in a longitudinally-spaced and laterally staggered disposition;

at least one double-edged two saw-tooth profiled latching-means-retaining member mounted on the fixed member; and whereby, for two sequential back and forth movements of the moveable member, during movements in one direction one latching means co-operates in turn with each of the saw teeth on one edge of the profile and causes lateral displacement of the retaining member to bring the other latching means into register with each of the saw teeth on the other edge of the profile;

and during the return movements the latter latching means co-operates with the saw teeth on that other edge to cause further lateral displacement to register the former latching means with the next adjacent saw tooth;

so that after the first back and forth movement the latter latching means latches the moveable member to the fixed member against the bias, and after the second back and forth movement the latter latching means is clear of the latching-means-retaining member, and the moveable member moves fully with the bias.

DETAILED SUMMARY OF THE INVENTION

In its first aspect the invention provides a ball valve. The valve may in theory be used in any situation in which a conventional such floating ball valve has hitherto been employed. However, the preferred embodiment of the invention has been developed for use in the pipe tubing of an oil well as the sub-surface control valve described earlier, by which well testing procedures are controlled. It is therefore in this context that the invention is for the most part described hereinafter.

The valve member itself—the ball—may be generally conventional in shape and construction. Thus, in the case of the sub-surface control valve just mentioned, it is preferably in the form of an INCONEL sphere of diameter approximately 10 cm (4 in) with a passageway therethrough about 6 cm (2.25 in) in diameter, and having flattened opposed sides constituting bearing surfaces which locate the ball within the internal width of the passageway through the valve.

The ball is housed within a seating adjacent the internal walls of the tubing (the passageway) within which the valve operates. The seating of the valve of the invention is subject to the same criteria as that of known valves—it is required to be extremely hard to minimise wear, and smooth to ensure a sealing yet slidable fit with the ball. The seating advantageously takes the form of two generally annular pieces of MONEL, set into the internal wall of the tubing.

Drivably connected to the ball is an actuating member to which a force is applied to operate the valve. In the preferred embodiment of the invention the actuating member is a tubing-contained longitudinally-moveable sleeve of the type described earlier, which sleeve has projecting therefrom a fixed pin which co-acts with an off-axis slot in the ball's flattened side so that movement of the sleeve causes the ball to rotate between its valve-open and valve-closed positions. The force which will operate the valve is conveniently applied to the sleeve not directly but via a floating annular piston attached thereto and sealed within the valve-contained passageway.

The operating force is applied to the ball valve of the invention by way of a differential thread force multiplier operatively linked thereto. In principle differential thread force multipliers are generally well known, and in this case the multiplier may take any convenient form. A particularly preferred form comprises:

a first elongate transmission member drivably connected at one end to the valve actuating member;

a second elongate transmission member mounted adjacent the free end of the first, the two being aligned for longitudinal movement, and their adjacent ends each bearing at least one pin projecting externally therefrom and normally thereto; and a third elongate transmission member slidably mounted over the adjacent ends of the first two, and having at least one laterally-spaced pair of differently-angled internal guide slots with which the corresponding pins co-operate.

As thus defined, the preferred force multiplier could be a trio of plates, two of them being the first and second transmission members and being generally coplanar, the other being the third transmission member and lying on and in sliding contact with the first two. Very preferably, however, each transmission member is a sleeve (in use encircling the pipe leading to the valve), so that the multiplier as a whole may be defined as:

a first inner sleeve drivably connected at one end to the valve actuating member;

a second inner sleeve mounted adjacent the free end of the first, the sleeves being co-axially aligned for axial movement, and their adjacent ends each bearing at least one pin projecting externally and normal therefrom; and an outer sleeve rotatably and slidably mounted around the inner sleeves' adjacent ends, and having at least one laterally-spaced pair of differently-angled internal guide slots;

each inner sleeve pin co-operating with the corresponding outer sleeve slot.

The first inner sleeve of the force multiplier is conveniently of elongate and essentially cylindrical form. Its particular shape and dimensions will naturally depend upon the size and application of the associated ball valve. In the sub-surface control valve of a well test string, the sleeve is most desirably about 9 cm (3.5 in) long, with 1 cm (0.5 in) thick walls and an inner diameter comparable to the dimensions of the ball—thus, about 8 cm (3 in). The sleeve is advantageously attached to the valve opening member by a simple screw thread on the internal surface thereof.

The second inner sleeve will generally be of broadly similar shape and dimensions to the first, such that the two sleeves may be mounted end-to-end effectively forming, when touching, a continuous cylinder over which the outer sleeve is mounted (as is described in more detail below). Each sleeve is capable of limited axial movement of a magnitude determined by the shape of the relevant guide slot in the outer sleeve.

Each inner sleeve has, near the end thereof adjacent the other sleeve, at least one pin projecting externally and normal therefrom. Preferably there are four such pins, spaced at regular intervals around the sleeve and mounted in the sleeve wall. It will be appreciated that the size and detailed nature of the pins must be such that they are compatible with the outer sleeve guide slots with which in use the pins co-act.

The force multiplier has a third, outer, sleeve. This sleeve too is advantageously in the form of an elongate cylinder, and of thickness and length comparable to one of the inner sleeves. The internal diameter of the outer sleeve is just large enough to permit it to be rotatably and slidably mounted around—that is to say, to ensleeve—the adjacent ends of the two inner sleeves.

The outer sleeve has at least one pair of differently-angled guide slots, with which the inner sleeve pins co-operate. Most preferably there are thus four such pairs, with one slot from each pair being associated with a pin from the first inner sleeve, and the other being associated with one from the second. The two slots of the or each pair are spaced along the length of the outer sleeve such that in use the pins always rest in corresponding positions along the guide slots—the outer sleeve may, for example, be fully rotated in a clockwise direction so causing each pin to lie adjacent the corresponding "clockwise" end of its associated slot.

The relative positions of the two slots (apart from their lateral spacing) is not crucial, and so although the slots may be side by side—that is to say, equally disposed about a line parallel to the sleeve's axis— they may alternatively be staggered—unequally disposed about such a line. In the case of a sleeve having more than one pair of guide slots, the former alternative will generally be more convenient.

Provided that the guide slots have sufficient depth to receive and retain the pins, they may be relatively shallow compared to the wall thickness of the outer sleeve, and so simply take the form of channels in the internal wall thereof. In the preferred embodiment of the sub-surface control valve, however, the slots actually extend all the way through the (relatively thin walled) sleeve. This allows the pins to be put into position through the slots after the outer sleeve has been placed over the two inner sleeves.

The two slots in the or each pair are at different angles relative to a plane normal to the sleeve's axis. The guide slot towards that end of the sleeve which in use lies nearer the ball valve is at a relatively small (shallow) angle thereto, whereas the other guide slot is at a larger (steeper) angle. It is this difference in angle which produces the differential thread effect of the force multiplier, as will be further described hereinbelow. Briefly, though, the slot at the steeper angle permits longitudinal (axial) travel of its associated pin through a relatively large distance, whereas the other more shallowly angled slot permits a smaller amount of such travel. The ratio of these distances corresponds inversely to the force multiplilcation effect produced by the device; convenient such ratios are in the range 2:1 to 5:1, with a ratio of 4:1 being particularly preferred. Thus, the second inner sleeve may move one inch, for example (this is quoted as a very convenient distance in practical terms), while the first inner sleeve will only move a quarter of an inch. As a result of the force multiplication effect, the applied force will at the same time have increased by a factor of four.

A force multiplier of the type presently being considered performs perfectly satisfactorily if each guide slot is shaped with its longer sides parallel. However, in one preferred embodiment of the invention, the valve is operated not only in conjunction with a force multiplier, but also with latch means which allows the valve to be operated by sequential pulsing, rather than continuous application, of pressure. In such a case, as is discussed later in that context, the steeper guide slot may be deliberately formed so that its sides are not parallel.

Figure 2:
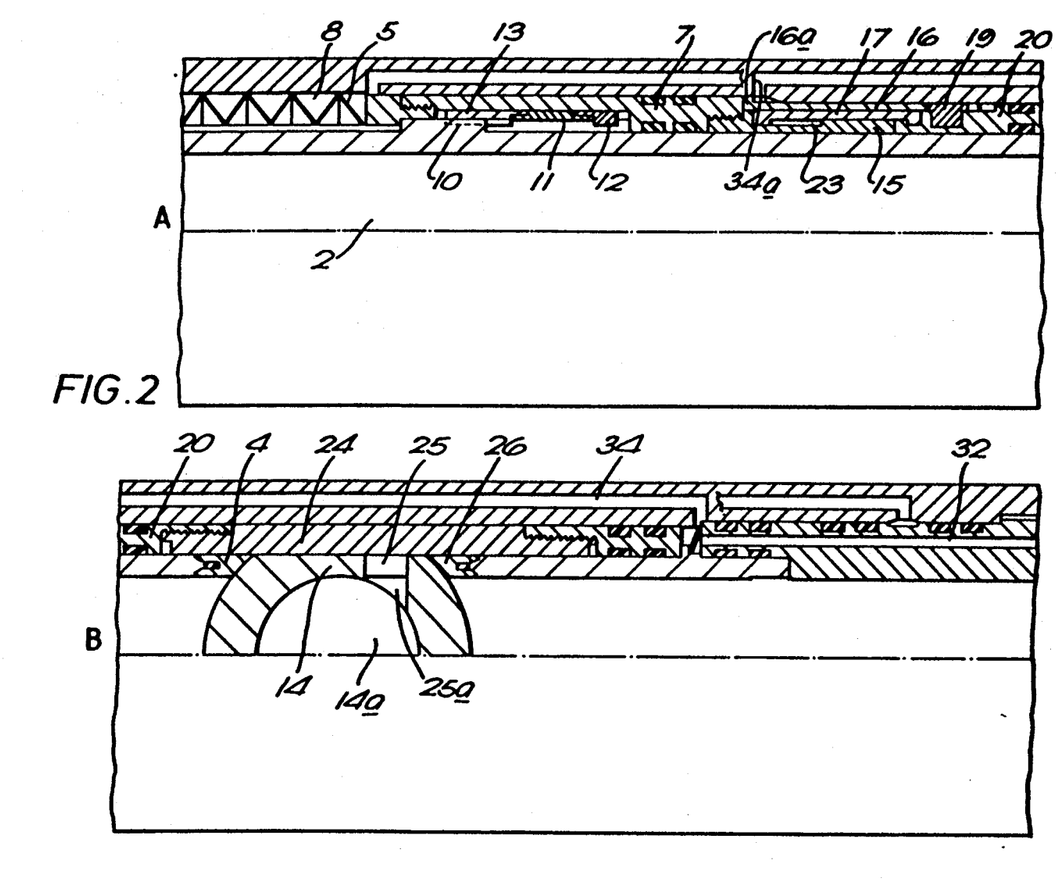
FIG. 2 shows in cross section a sub-surface control valve of the invention in the closed position (in both FIG. 2 and FIG. 3 the A and B parts of the Figure run on from each other; the left side (as viewed) of the latter connecting to the right side (as viewed) of the former)
Figure 4:
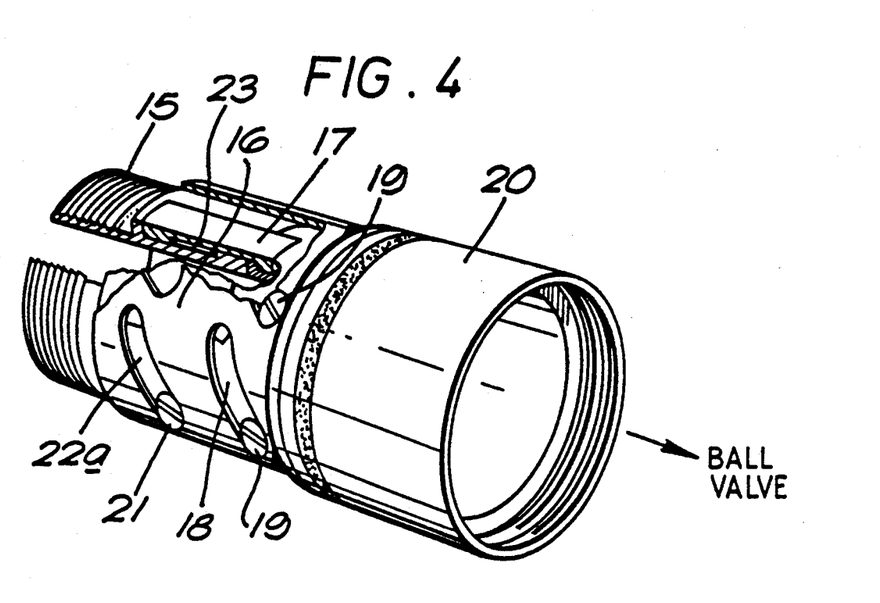
FIG. 4 is a perspective view in part cutaway form of a force multiplier similar to that employed in the valve of FIG. 2.

Prior to the opening of the ball valve, the adjacent ends of the two inner sleeves of the force multiplier are in contact with each other, and the outer sleeve is positioned such that each inner sleeve pin is resting at that end of its guide slot lying nearer the ball valve (this situation is illustrated in FIGS. 2 and 4 of the accompanying Drawings). When the valve is to be opened, a force is applied to the second inner sleeve which causes axial movement thereof in the valve-upstream direction. As the sleeve moves, so the pin thereon moves correspondingly within its outer sleeve guide slot causing, as it does so, the outer sleeve to rotate (as a result of the slot being angled). This rotational movement induces longitudinal (axial) movement of the first inner sleeve via co-operation of the second guide slot of the pair with the first inner sleeve pin. However, the differing angles of the two guide slots provide a differential screw thread effect, so that the distance moved axially by the first inner sleeve is smaller than that moved by the second. Accordingly, just as a lever allows a small force exerted over a large distance to generate a large force exerted over a small distance, so the force now transmitted by the first sleeve to the valve actuating member is greater than that originally applied to the second sleeve (the force is now acting, however, over a correspondingly shorter distance).

As mentioned above, the preferred ratio of movements is 4:1. This ensures the generation of a force sufficiently large to overcome frictional forces caused by the ball being pressed against its seating on the downstream side of the valve, and thus the valve may easily be opened. However, to rotate the ball into its fully open position—with the hole therethrough perfectly aligned with the tubing—may require further movement of the valve actuating member than the ¼ inch produced by the force multiplier up to this point. In a preferred embodiment of the invention, therefore, there is a second phase of movement of the inner sleeves of the force multiplier during which both sleeves move the same distance. There is, during this phase, no multiplication of the force applied. This does not matter, however, since the valve ball has already been "unstuck", and will now continue to move freely under the influence of a relatively small actuating force. The force is at this point advantageously transmitted through the multiplier by means of an independent link, or "key", between the two sleeves which, as will now be explained, helps to reduce the load borne by the pins.

It will be appreciated that, during the course of a force multiplication sequence as previously described, the load is carried and transmitted within the force multiplier by the pins. Although in theory it would be possible to construct a multiplier with pins sufficiently robust to bear this load all the time, such construction would undoubtedly make that multiplier rather expensive. A preferable alternative in practice is to employ one or more load-bearing "keys" which relieve the burden placed upon the pins. The preferred embodiment of the invention employs four such keys to form a bridging link between the two inner sleeves. Relative longitudinal movement of the two sleeves during force multiplication is permitted by a wide channel in the outer surface of the second inner sleeve across which the key can move during longitudinal movement of the second inner sleeve. This channel, or slot, allows the two inner sleeves to move longitudinally one relative to the other when the relevant pair of pins is actually moving the sleeves differentially. Thereafter, when the available differential movement has ceased and the sleeves enter the phase of 1:1 movement described above, the key carries the load.

In its second aspect, the invention provides apparatus for latching a longitudinally moveable member to a fixed member against bias-induced relative movement in one such direction. The primary intended use of this apparatus is to enable an oil well test string's subsurface control valve to be opened by the application of a first pulse of high pressure to the well annulus, to be held open after the cessation of this pulse, and then to be closed following a second pulse of annulus pressure. In the preferred embodiment of the invention, therefore, the longitudinally moveable member is operatively linked to the valve actuating member of a sub-surface control valve such as that described hereinbefore and the latching apparatus of the invention latches the moveable member to a fixed member (the well tubing) so overriding a closing bias, and thus permitting the valve to remain open in the absence of any positive driving force.

In the above-mentioned preferred embodiment of the invention, the longitudinally moveable member takes the form of an elongate cylinder or sleeve known as the inner index sleeve. This sleeve is conveniently about 9 cm (3.5 in) long and 10 cm (4 in) in diameter. It is situated in the tubing wall upstream of the sub-surface control valve within an annular piston mounted over and around it. The piston has two ends, of which one is drivably connected to the valve actuating member, and the other to that component (generally a spring) which provides the valve bias. It may be appreciated that, in a particularly preferred embodiment, the inner index sleeve is connected to the valve actuating member via a force multiplier. The fixed member against which the moveable member is latched is conveniently part of the adjacent tubing wall of the string.

The longitudinally moveable member has mounted thereon two pin-like latching means, or "indexing pins". These pins are most conveniently formed separately from the moveable member and then subsequently attached thereto in some suitable manner (preferably as a press fit into matching apertures in the moveable member). The shape, longitudinal spacing and lateral displacement (staggering) of the pins must permit their co-operation in use with the profile of the retaining member. As may perhaps be seen more clearly by reference to FIG. 6 of the accompanying Drawings, the body of each pin defines a point projecting longitudinally, which point fits between the saw teeth of the profile of the retaining member. These projections are so laterally staggered that one or other of them is always in register, and may co-operate, with the sawtoothed-profiled pin-retaining member. In addition, the body of one pin—that lying nearer the valve—has a laterally-projecting detent bar which in use restricts the longitudinal movement of that pin relative to the retaining member, whilst the other pin has a similar but longitudinally-projecting such bar which restricts its lateral movement.

The apparatus of the invention has at least one double-edged, two saw-toothed profiled pin-retaining member. If there is only one such member, provision must be made to "re-set" the apparatus after each complete latching/unlatching operation in order to bring one of the indexing pins back into its initial position in register with the profile. More preferably, therefore, where the fixed member is cylindrical (part of the tubing, say), there is a series of retaining members regularly spaced around that fixed member such that the pins co-operate with each in turn, thus moving continuously around the cylinder. In the preferred embodiment of the invention there are sixteen retaining members. They conveniently take the form of relief mouldings on the surface of the fixed member—that is, on the inner tubing wall—laterally spaced and longitudinally aligned, and each projecting into an annular space within the tubing walls.

The or each retaining member has a double-edged, two saw-toothed profile. The shape of the member thus conveniently approximates that of an isosceles triangle having a small pointed incision in each of its equal sides.

The successful functioning of the latching means of the invention requires there to be a small degree of movement of the moveable member with the bias after the end of the first (valve-opening) pressure pulse. This ensures that the indexing pin is correctly guided into the retaining member, thereby latching the moveable member and preventing further, undesired, movement thereof. However, in the case where the moveable member is operatively connected to the valve actuating member of a sub-surface control valve, such a movement of the former with the bias will tend, at least partially, to close the valve. This unwanted closing effect is conveniently avoided, for valves having an associated force multiplier of the type described earlier, by judicious planning of the shape of the outer sleeve guide slots of the multiplier (as alluded to hereinbefore).

Any movement of the second inner sleeve of the force multiplier (caused by longitudinal movement within the latching apparatus) is normally transmitted, via movement of the inner sleeve pins within their guide slots, to the first inner sleeve and thence to the valve actuating member. However, by designing the steeper slot with one side "bent"—bowed outwards, so it is no longer parallel to the other side—there may be permitted in one direction some initial "free" movement of the second sleeve which has no rotating effect on the outer sleeve and thus does not cause the first sleeve to move. More specifically, this is achieved by allowing the slot-confined pin to move axially for the first part of its travel in the direction towards the ball valve, as it would if not guided by the slot. The remainder of the pin's movement does induce rotation of the outer sleeve (as before), so that after a second pressure pulse, when the latch is released, the valve actuating member is driven by the first sleeve to close the valve.

Naturally, the invention extends to the utilisation of such a latching apparatus to retain a ball valve—specifically a sub-surface control valve suitable for use in an oil well—in the open position against a valve-closing bias.

The materials employed in the construction of the various components of the two inventions hereinbefore described may be any of those normally utilised in the Art for similar construction. Thus, for example, the tubing of the tool may be of a standard mild steel, and the valve gear may be of any suitably non-corrosive substance.

BRIEF DESCRIPTION OF THE DRAWINGS

An embodiment of the invention is now described, though by way of illustration only, with reference to the accompanying diagrammatic drawings in which.

DETAILED DESCRIPTION OF THE DRAWINGS

Figure 1:
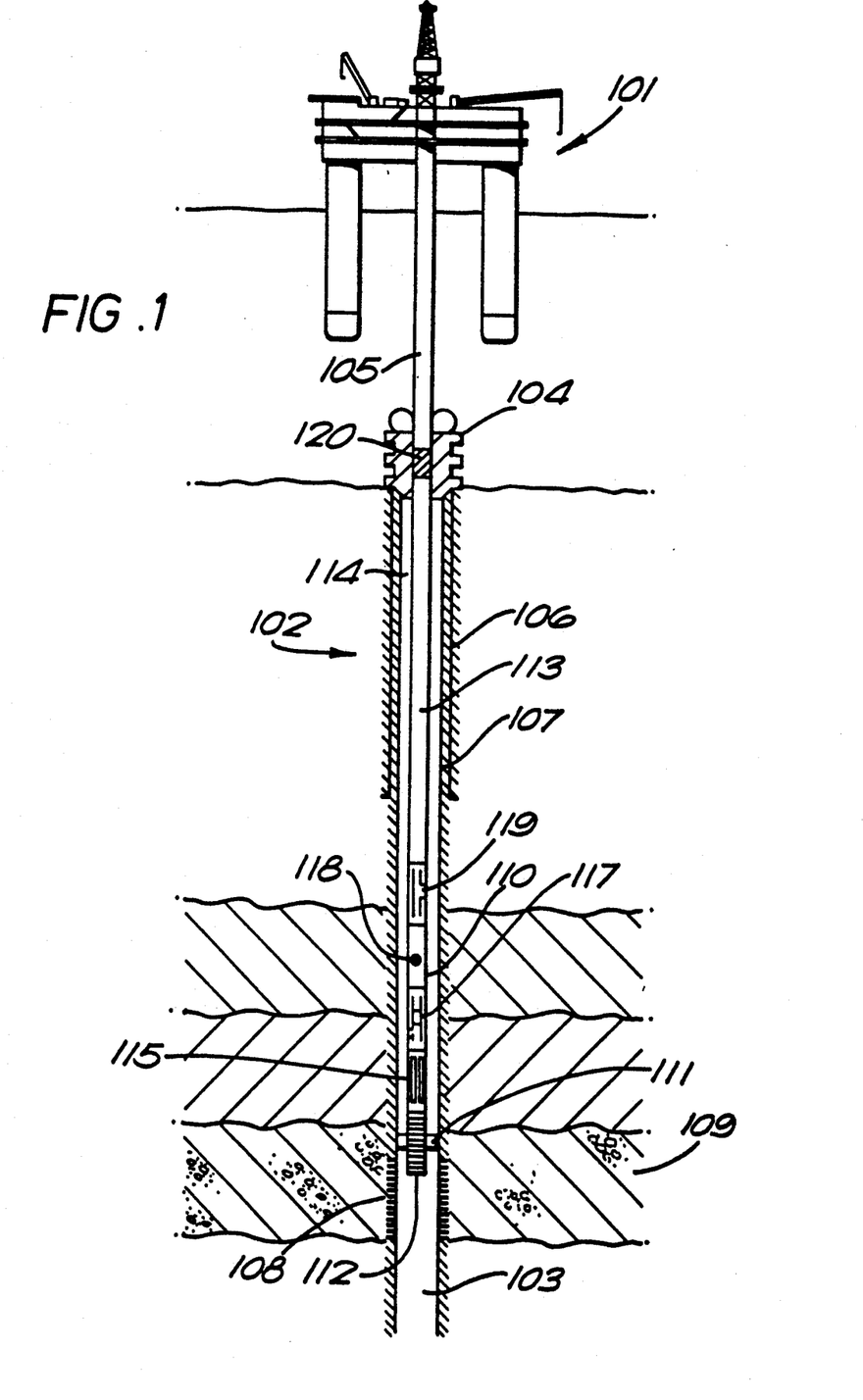
FIG. 1 is a simplified cross-sectional view of an offshore oil well with a test string including a valve of the invention.

FIG. 1 shows a floating drilling rig (101, not shown in detail) from which has been drilled an oil well (generally 102) having a well bore (103) reaching down to a rock stratum constituting the formation (109) of interest. Located at the top of the well bore 103 is a blow-out preventer mechanism (BOP; 104, not shown in detail) which is connected to the rig 101 by a marine riser (105). Cemented into the well bore 103 are a shallow casing (106) and a deep casing (107); the lower end of the latter has a multitude of perforations (as 108) permitting communication between the well bore 103 and the oil formation 109.

Situated within the well bore 103 is a test string (110) comprising tubing (113) ending in a set of test tools (see below). The string 110 is set at its lower end into a packer (111), and a seal sleeve (112) seals the packer 111 to the test string 110, thus isolating the tubing 113 thereof from the annulus (114).

Above the seal sleeve 112 is a gauge carrier (115) which contains electronic or mechanical gauges (not shown) which collect downhole pressure and temperature data during the test sequence. Above the gauge carrier 115 are a constant pressure reference tool (117) and the sub-surface control valve (118). A circulating sleeve (119) permits removal of any formation fluid remaining within the test string 110 prior to its withdrawal from the well bore 103. At the top of the test string is a subsea test tree (120) which serves both as a primary safety valve and as a support for the rest of the test string 110.

Figure 3:
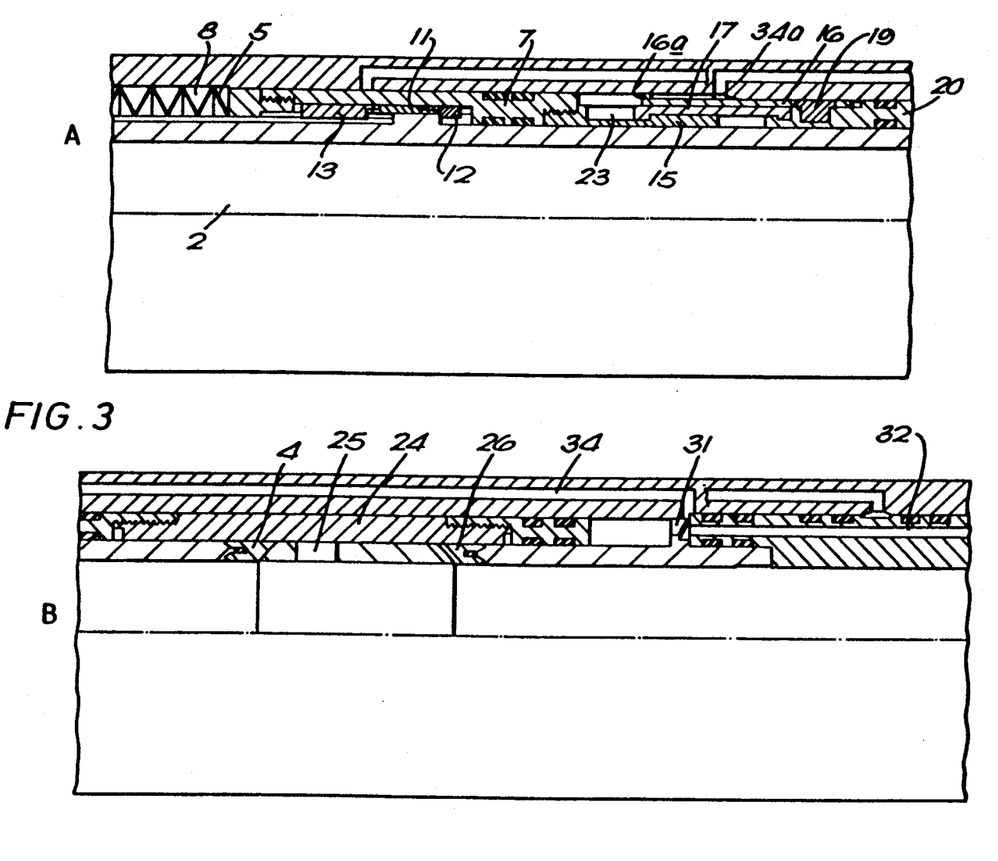
FIG. 3 is like FIG. 2, but shows the valve when open.

The ball of the sub-surface control valve of FIGS. 2 and 3 is located within the test string tubing (2), housed between two annular metal seating sections (4, 26). A pin (25) projects from a cylindrical pipe-aligned actuating mandrel (24) into a slot (25a) in the surface of the ball 14. A passageway (14a) extends through the ball. The actuating mandrel 24 is screwed to the upper inner sleeve (20) of a differential screwthread force multiplier (a device of a similar but slightly simpler type is shown in perspective view in FIG. 4). This sleeve is attached by means of a pin (19) to an outer sleeve (16), to which is similarly attached by a pin (21; not shown in FIGS. 2 and 3) the associated lower inner sleeve (15). The two sleeves 15 and 20 are further linked by an inlaid key (17). Relative longitudinal (axial) movement of those sleeves is permitted by a channel (23) in the lower inner sleeve 15 across which the key 17 may travel.

Figure 5:
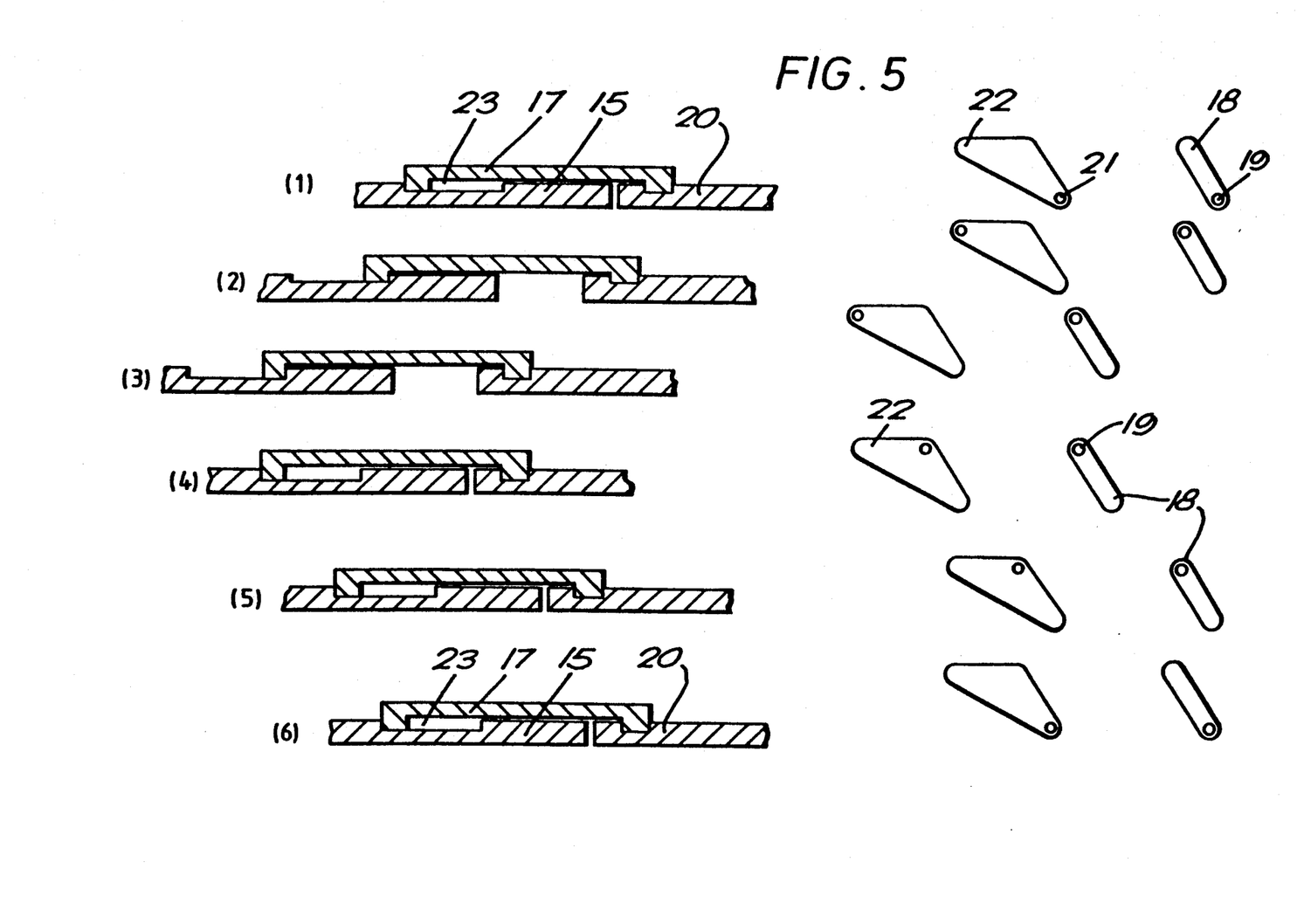
FIG. 5 shows the sequence of movements of the components of the force multiplier of the valve of FIGS. 2 and 3 during its operation.
Figure 6:
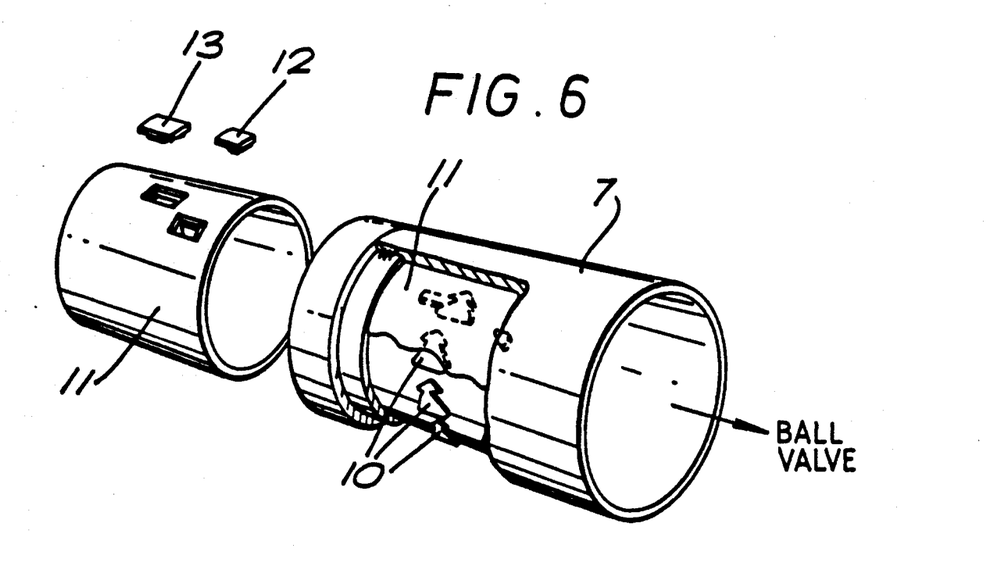
FIG. 6 shows in part cutaway form the latching apparatus of the valve of FIG. 2.

The sequence of movements during valve opening and closing of the two inner sleeves and the key are shown in FIG. 5, together with the corresponding movements of the pins 19, 21 within the outer sleeve guide slots (18, 22). As best seen in FIG. 6, within the tubing wall adjacent the valve-distant end of the lower inner sleeve 15 there is an annular piston (7), which is mounted over and around an elongate inner index sleeve (11) constituting the longitudinally moveable member of a latching apparatus of the invention. Projecting from the inner surface of the sleeve are two indexing pins (12, 13), which co-operate with the profiles of a series of retaining members (as 10; only one such member is shown in FIGS. 2 and 3). These retaining members are raised sections of an internal surface of the test string tubing 2. The piston 7 is attached at its other end to a spring (5), contained in an annular space (8) within the tubing walls, which spring provides a valve-closing bias.

When the valve is closed, it is initially in the state depicted in FIG. 2. To open it, a pulse of high pressure is applied to the annulus. This pressure is transmitted to a chamber of hydraulic fluid (contained within another part of the test string, not shown), and thence, by way of two flow paths (32, 34), to the upper ends of the valve-actuating mandrel 24 and the piston 7 respectively. This creates a pressure differential across piston 7 (on the lower end of which is acting a tool-contained reference—hydrostatic—pressure only), which causes the piston 7 to move downwards (to the left as viewed, away from the valve), compressing the spring 5 as it does so. Movement of the piston additionally moves the index sleeve 11, causing the indexing pin 12 to engage with the profile of the retaining member 10 and, furthermore, moves the lower inner sleeve 15 of the force multiplier a distance of 1 inch. As the sleeve 15 moves, the pin 21 thereon (not shown in FIGS. 2 and 3) co-operates with its outer sleeve guide slot (22; not shown in FIGS. 2 and 3) to cause rotation of the outer sleeve 16; this in turn induces the upper inner sleeve 20 to move ¼ inch (this corresponds to Diagram 2 of FIG. 5). This movement is transmitted to the valve-actuating mandrel 24, which thus causes the ball 14 to rotate and the valve to start to open. Subsequently, both sleeves travel a further 1 inch, during a second phase of movement, to complete the opening of the valve (see Diagram 3 of FIG. 5).

Once the valve has opened the pressure pulse ends. The pressure of the hydraulic liquid now returns to the hydrostatic pressure, and the spring 5 will tend to force the piston 7 back towards the valve. However, the indexing pin 13 is now in register with the profile on the other side of the retaining member 10, and co-acts therewith to latch the inner index sleeve 11 (and thus the piston 7) in position, thereby preventing the bias-induced valve-closing action. There is, during the small (¾ inch) backwards "latching" movement of the indexing pin 13, a corresponding movement of the lower inner sleeve 15. In the FIGS. 2/3 embodiment this movement is not, however, transmitted to the upper inner sleeve 20 since the guide slot 22 is shaped to allow ¾ inch of "free" axial movement in this direction—the pin 21 simply moves to the centre position of the slot 22 without causing rotation of the outer sleeve 16, the key 17 moves across channel 23, and the valve remains fully open (Diagram 4 of FIG. 5). The FIG. 4 force multiplier does not have a slot (22a) with this shaping, and so in this letter device a movement of the lower inner sleeve 15 as just described would being about some degree of closure of the valve.

The state of the components of the sub-surface control valve when open are illustrated in FIG. 3.

To close the valve, a second pulse of annulus pressure is applied. This causes downward movement of piston 7 in the same way as before, unlatching indexing pin 13 from retaining member 10. The lower inner sleeve 15 is caused to move back to its "fully extended" position—its pin 21 returns to the end of guide slot 22 with no rotational movement of outer sleeve 16 or of upper inner sleeve 20 (the situation thus returns to that shown in Diagram 3 of FIG. 5). The valve is still fully open at this stage. To allow it to close, the applied pressure is removed. The pressure of the hydraulic liquid in flow path 34 returns to the hydrostatic pressure and the spring 5 forces piston 7 upwards. The indexing pins 12 and 13 return to their original positions. The lower inner sleeve 15 and the upper inner sleeve 20 of the force multiplier are now touching, and a 1 in movement of the former (induced by the piston 7) causes an equal movement of the latter, with the key 17 set against the top of channel 23. The outer sleeve moves with the inner sleeves without rotating (Diagram 5 of FIG. 5). After this movement of 1 in, however, the outer sleeve has returned to its original position relative to the (fixed) tubing walls, at which point further longitudinal movement thereof is physically prevented by the outwardly-directed lip (16a) coming up against the step (34a) aligned with the exit of flow path 34 within the tubing wall. The inner sleeves must still, by contrast, move an additional ¼ in to return to their original (valve closed) state. To achieve this, the pins 19, 21 travel within the guide slots 18, 22—in the case of the latter (the steep slot), the pin travels from the mid-point to the end thereof; in the case of the former (the shallow slot), the pin travels the entire length. During this final ¼ in longitudinal movement of the inner sleeves 15, 20 the outer sleeve 16 is forced to rotate. The final state of the sleeves (Diagram 6 of FIG. 5) is therefore the same as their original position in Diagram 1.

Figure 7:
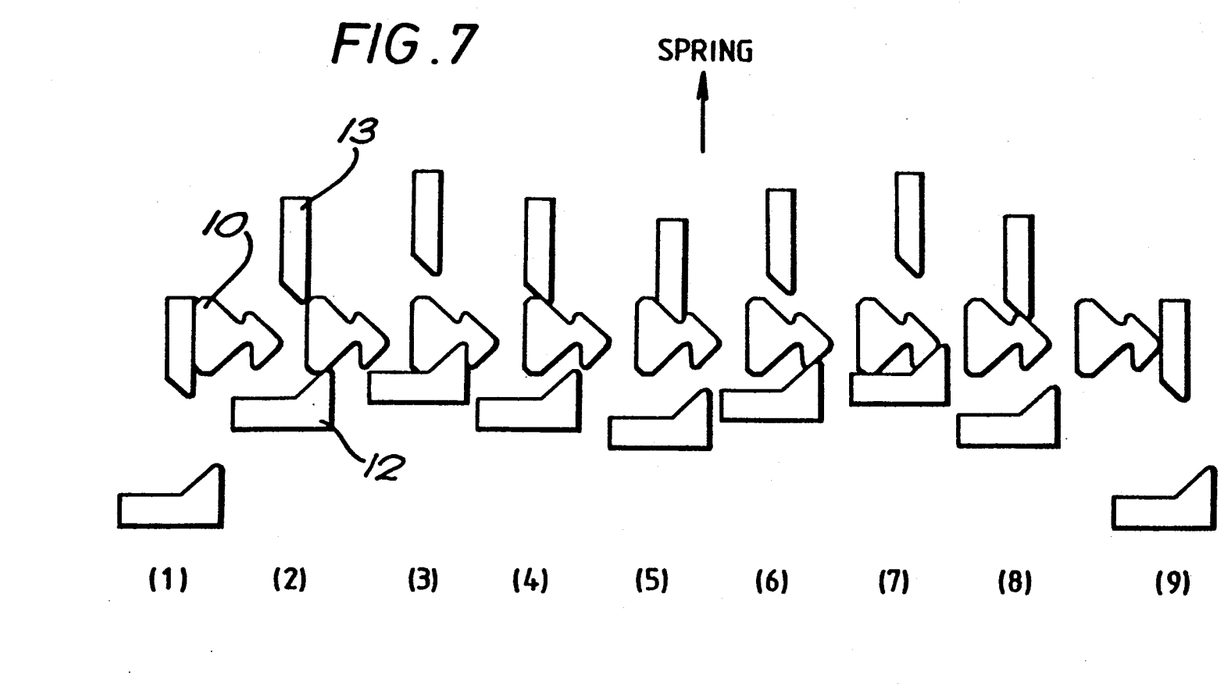
FIG. 7 shows the sequence of movements during operation of the latching apparatus of FIG. 6.

FIG. 6 shows in perspective the indexing pins 12, 13 and the series of profiled retaining members as 10. The interactions of these parts during the pressure pulsing are shown in the sequence of FIG. 7.

The first pressure pulse causes longitudinal movement of the indexing pins 12, 13 on the inner index sleeve 11, as already described hereinabove. This brings the pointed part of the pin 12 into contact with a "tooth" on one side of the profile, and the two co-operate to cause lateral displacement of the retaining member 10 (FIG. 7, positions 2 and 3). When this pulse ends, the inner index sleeve 11 begins to return to its original position. However, pin 13 has now been brought into register with the other side of the profile, and latches the sleeve 11 against the tubing walls, preventing further such longitudinal movement (position 5 of FIG. 7).

When the valve is to be closed, the second pressure pulse causes pin 13 to be pushed free of the profile, whilst pin 12 once more co-operates therewith to effect further lateral displacement of the retaining member 10 (position 6). When the pressure is finally returned to the ambient hydrostatic value, pin 13 moves again into contact with the profile and induces a last lateral displacement of the retaining member, which displacement eventually brings both pins to a state similar to that of their original position (1), but now with respect to the next adjacent profiled retaining member of the series.

We claim:

1. A ball valve wherein for use in a pipe and having a valve seating position within the pipe, a floating ball within said seating and moveable between two positions one defining a valve open position and the other defining a valve closed position, and an associated valve actuating member driveably connected to the ball and to which force is applied to drive the ball between its valve open and valve closed positions, comprising a differential thread force multiplier in said ball valve operatively linked to said actuating member to which the actuating force is applied including;

a first elongate transmission member having a wall and two opposed ends and driveably connected at one end to the valve actuating member and having the other end free;

a second elongate transmission member having a wall and two opposed ends and mounted adjacent the free end of said first member, the two being aligned for longitudinal movement, and their adjacent ends each bearing at least one pin projecting externally therefrom and normally thereto; and a third elongate transmission member having a wall and two opposed ends and slidably mounted over the adjacent ends of said first and second transmission members, and having at least one laterally-spaced pair of differently-angled internal guide slots with which the corresponding pins co-operate, the depth of the wall of said third member forming the sides of these slots.

2. A ball valve as claimed in claim 1, wherein each of the force multiplier's transmission members is a sleeve, which in use encircles the pipe leading to the valve, so that the multiplier as a whole may be defined as:

a first inner sleeve having a wall and two opposed ends and drivably connected at one end to the valve actuating member, the other end being free;

a second inner sleeve having a wall and two opposed ends and mounted adjacent the free end of said first sleeve, the sleeves being co-axially aligned for axial movement, and their adjacent ends each bearing at least one pin projecting externally and normally therefrom; and an outer sleeve having a wall and two opposed ends and rotatably and slidably mounted around said inner sleeves' adjacent ends, and having at least one laterally-spaced pair of differently-angled internal guide slots;

each inner sleeve pin co-operating with the corresponding outer sleeve slot.

3. A ball valve as claimed in claim 2, wherein each inner sleeve has, near the end thereof adjacent the other sleeve, four pins projecting externally and normally therefrom, these pins being spaced at regular intervals around the sleeve and mounted in the sleeve wall.

4. A ball valve as claimed in claim 3, wherein the outer sleeve has four pairs of differently-angled guide slots, with which the inner sleeve pins co-operate, one slot from each pair being associated with a pin from the first inner sleeve, and the other being associated with one from the second.

5. A ball valve as claimed in claim 4, wherein the two slots of each pair of slots are side by side.

6. A ball valve as claimed in claim 1, wherein the slots in the differential thread force multiplier's third transmission member actually extend all the way through the wall of the member.

7. A ball valve as claimed in claim 1, wherein the steeper guide slot of each pair in the third transmission member is formed so that its sides are not parallel but rather converge/diverge along the length of the slot.

8. A ball valve as claimed in any one of claims 1 to 7, wherein the differential thread force multiplier permits a second phase of movement of the first and second transmission members during which both move the same distance so there is, during this phase, no multiplication of the force applied.

9. A ball valve as claimed in claim 8, wherein there is an independent link, or key, between the two transmission members, and during this second phase the force is transmitted through the multiplier by means of said independent link.

10. A ball valve as claimed in claim 9, including a wide channel in the outer surface of the second transmission member, wherein relative longitudinal movement of the first and second transmission members during force multiplication is permitted by said wide channel in the outer surface of the second member across which the key can move during longitudinal movement of the second member.

11. A ball valve as claimed in claim 9, in which said independent link comprises four of said independent links which together form a bridging link between the said first and second transmission members.

12. Apparatus for latching a laterally and back-and-forth longitudinally moveable member to a fixed member against bias-induced relative movement in on such longitudinal direction, comprising two pin-like latching means, mounted on the moveable member in a longitudinally-spaced and laterally-staggered disposition; and at least one latching means-retaining member mounted on the fixed member in operative association with said latching means, each retaining member having two opposed edges each of which is profiled like two side-by-side saw teeth;

whereby, for two sequential back and forth movements of the moveable member, during movements in one direction one latching means co-operates in turn with each of the saw teeth on one edge of the profile and causes lateral displacement of the moveable member relative to the retaining member on the fixed member to bring the other latching means into register with each of the saw teeth on the other edge of the profile;

and during the return movements the latter latching means co-operates with the saw teeth on that other edge to cause further lateral displacement to register the former latching means with the next adjacent saw tooth;

so that after the first back and forth movement the latter latching means latches the moveable member to the fixed member against the bias, and after the second back and forth movement the latter latching means is clear of the latching means-retaining member, and the moveable member moves fully with the bias.

13. Latching apparatus as claimed in claim 12, wherein the longitudinally moveable member's two pin-like latching means, or indexing pins, each have a shape, longitudinal spacing and lateral displacement, or staggering, permitting their co-operation in use with the profile of the retaining member, and the body of each pin defines a point projecting longitudinally, which point fits between the saw teeth of the profile of the retaining member.

14. Latching apparatus as claimed in claim 13, wherein the body of one pin has a laterally-projecting detent bar which in use restricts the longitudinal movement of that pin relative to the retaining member, whilst the body of the other pin has a similar but longitudinally-projecting such bar which restricts its lateral movement.

15. Latching apparatus as claimed in claim 12, wherein, the fixed member is cylindrical, and there is a series of retaining members regularly spaced around that fixed member such that the pins co-operate with each in turn, thus moving continuously around the cylinder.

16. Latching apparatus as claimed in claim 15, wherein the retaining members take the form of relief mouldings on the surface of the fixed member laterally spaced and longitudinally aligned, and each projecting into an annular space there-within.

17. Latching apparatus as claimed in claim 12, for use in well tubing, including a sub-surface ball control valve of the type having a valve seating positioned within the tubing, a floating ball within said seating and moveable between two positions one defining a valve-open position and the other defining a valve-closed position, an associated valve actuating member driveably connected to the ball and to which force is applied to drive the ball between its valve-open and valve-closed positions, a differential thread force multiplier in said ball valve operatively linked to said actuating member and to which actuating force is applied, in which said longitudinally moveable member is operatively linked to the valve actuating member, and the latching apparatus latches said moveable member to the well tubing, as the fixed member, so overriding a valve-closing bias, and thus permitting the valve to remain open in the absence of any positive driving force.

18. Latching apparatus as claimed in claim 17, wherein the longitudinally moveable member takes the form of an elongate cylinder or sleeve, the inner index sleeve, situated in the tubing wall upstream of the sub-surface control valve within an elongate annular piston having two opposed ends and mounted over and around it, one of said piston's two ends being driveably connected to the valve actuating member, and the other being connected to that component which provides the valve bias.

19. For use in a pipe, a ball valve of the type having a valve seating positioned within the pipe, a floating ball within said seating and moveable between two positions one defining a valve-open position and the other defining a valve-closed position, and an associated actuating member driveably connected to the ball and to which force is applied to drive the ball between its valve-open and valve-closed positions,
in which ball valve there is operatively linked to said actuating member a differential thread force multiplier to which the actuating force is applied.

* * * * *